US010483599B2

(12) United States Patent
McSweyn et al.

(10) Patent No.: US 10,483,599 B2
(45) Date of Patent: Nov. 19, 2019

(54) MAGNETICALLY ATTACHED BATTERY PACK WITH AUDIO INTERFACE

(71) Applicant: SCOSCHE INDUSTRIES, INC., Oxnard, CA (US)

(72) Inventors: Christopher Michael McSweyn, Oxnard, CA (US); Vince Alves, Oxnard, CA (US)

(73) Assignee: Scosche Industries, Inc., Oxnard, CA (US)

( * ) Notice: Subject to any disclaimer, the term of this patent is extended or adjusted under 35 U.S.C. 154(b) by 0 days.

(21) Appl. No.: 15/352,432

(22) Filed: Nov. 15, 2016

(65) Prior Publication Data

US 2018/0097373 A1 Apr. 5, 2018

Related U.S. Application Data

(60) Provisional application No. 62/404,697, filed on Oct. 5, 2016.

(51) Int. Cl.
*H04M 1/00* (2006.01)
*H01M 10/46* (2006.01)
*H01M 10/42* (2006.01)
*H02J 7/00* (2006.01)

(52) U.S. Cl.
CPC ......... *H01M 10/46* (2013.01); *H01M 10/425* (2013.01); *H02J 7/0042* (2013.01); *H02J 7/0054* (2013.01); *H01M 2010/4278* (2013.01); *H02J 2007/0062* (2013.01); *H02J 2007/0096* (2013.01)

(58) Field of Classification Search
CPC ...... H02J 7/0021; H02J 7/0045; H02J 7/0054; H02J 2007/0062; H02J 2007/0096; H02J 2007/4278; H04M 10/46; H04M 10/425
See application file for complete search history.

(56) References Cited

U.S. PATENT DOCUMENTS

| 2003/0042868 | A1* | 3/2003 | Muramatsu | H02J 7/0044 320/107 |
| 2013/0005303 | A1* | 1/2013 | Song | A61B 5/02438 455/411 |
| 2014/0003616 | A1* | 1/2014 | Johnson | H04R 29/001 381/74 |
| 2015/0052270 | A1* | 2/2015 | Wong | G06F 13/124 710/106 |
| 2015/0194839 | A1* | 7/2015 | Wojcik | H02J 7/025 320/108 |
| 2016/0166766 | A1* | 6/2016 | Schuster | G06F 19/3468 702/54 |

* cited by examiner

Primary Examiner — Tuan Pham
(74) Attorney, Agent, or Firm — Stetina Brunda Garred & Brucker

(57) ABSTRACT

A device for charging a mobile device, which is also capable of converting a digital audio signal of a mobile device in to an analog audio signal, includes a first digital interface, a digital to analog converter, and a preamplifier. The first digital interface is configured to provide power to a mobile device connected thereto in order to charge the mobile device, and the digital audio signal from the mobile device is passed to a digital to analog converter. A second digital interface or an analog jack may be incorporated, which is connectable to a headphone or other audio output device.

15 Claims, 6 Drawing Sheets

MAGNETICALLY ATTACHED BATTERY PACK WITH AUDIO INTERFACE

CROSS-REFERENCE TO RELATED APPLICATIONS

The application relates to and claims the benefit under 35 U.S.C. § 119(e) to U.S. Provisional Patent Application No. 62/404,697 filed Oct. 5, 2016 and entitled "MAGNETICALLY ATTACHED BATTERY PACK WITH AUDIO INTERFACE," the entire contents of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to electrical connectors for power and data interconnections of electronic devices, and more particularly, to power and data connections for mobile devices.

2. Related Art

Multi-function electronic devices such as smartphones and tablets are widely used. One of the most common functions of these devices is to play back audio content such as music, audiobooks, podcasts, and the like. There are also purpose-made devices which perform this function exclusively, also known in the art as portable music players. Unlike smartphones in which the audio playback functionality is accessed by invoking one of multiple software applications installed on the device, portable music players have a more direct interface to selecting the audio playback controls, some of which may be provided as hardware inputs. Many smartphones include a speaker through which audio may be played back, but almost all smartphones and portable media players alike include headphone jacks, to which headphones, earphones, and the like may be connected.

Because these devices are used for so many different functions, users tend to operate such multi-function devices for long periods. Often times, the devices are operated when the user is away from power sources. When a user is away from hard wired power sources, such as a wall outlet or a personal computer plugged in to a wall source, the multi-function device may run out of battery power entirely. If the battery runs out of power, the user may miss important communication, either via voice or text. This communication may be critical for any number of reasons, and the user may need to respond immediately. For example, there might be a deadline associate with the communication.

Charging on the go becomes very important in this context. There are multiple devices in the marketplace which can assist with such a scenario. Instant battery chargers and solar panels geared to charge multi-function mobile devices. Instant battery chargers and solar panels each have their problems. Solar panels tend to charge very slowly. Instant battery chargers, or power banks, tend to be bulky, heavy, expensive, and need charging themselves.

Moreover, not every mobile device has a stereo audio jack for use with headphones, or a headphone/microphone combination. Some mobile devices have a single external output, which may be a standard data interconnect such as USB, mini USB, or micro USB ports. Others, such as the Apple iPhone, may utilize a proprietary connection known as the Lightning connector, which require matching proprietary plug and port. Thus, when charging, the device needs to have this sole port connected, and the port is not available to transfer audio for a voice call, or to play the audio player of the phone. Even some devices that do have a jack that may be used for charging and a separate jack for accessing audio may not have software that allows their simultaneous use.

In any implementation of digital audio, a digital-to-analog converter (DAC) is necessary to translate the stream of data representative of the soundwaves to an analog signal that is transduced by the loudspeaker to sound. The mobile device includes such a DAC integrated circuit, and the analog signal therefrom is output to the audio jack. For instance, a stereo analog audio signal that drives a pair of headphones or loudspeakers are comprised of two sets of voltages, with one set representing the signal for the left channel, and the other set representing the signal for the right channel. The frequency of the voltages is varied to yield the audio signal. These voltages are transferred through the tip and ring of a standard 3.5 mm stereo audio connector and corresponding jack, with the ground being on the sleeve of the connector and jack.

It may also be possible to directly output or stream the digital data corresponding to the audio signal to the aforementioned data interconnects (USB, and variants thereof, Lighting, etc.). The analog audio signal is reconstituted from the digital data after transmission through the cable or interconnect. Proprietary connectors use several pins in a predetermined, or a dynamic configuration. For instance, the Apple Lighting connector uses eight pins, and the function of the pins may vary depending on the devices that are connected. The connector may or may not have an analog audio breakout to two of the pins as part of the proprietary standard. When the proprietary connector lacks an analog audio breakout, any connecting device used to receive audio from the mobile device must have a DAC integrated circuit.

Thus, where the mobile device is limited to a proprietary external connection, and the breakout scheme for signals from the device across the different pins of the port does not accommodate an analog audio signal, a digital to analog converter on the cable, an adapter, or on a device on the opposite end of the cable to convert the digital signal to an analog audio signal.

BRIEF SUMMARY

The embodiments of the present disclosure are directed to a device for charging a mobile device. The device may include a housing defined by a distal side, a proximal side, and a perimeter wall. Additionally, there may be a battery that is integrated in to the housing. The battery may be receptive to power from an alternating current power source. The device may also include a digital interface integrated in to the housing and in electrical communication with the battery. Furthermore, there may be a digital to analog converter with an input that is connected to the digital interface, as well as an output. The digital to analog converter may be receptive to a digital signal from the digital interface. The device may further include an analog audio jack that is integrated in to the housing and connected to the output of the digital to analog converter. The analog audio jack may be receptive to an analog signal from the digital to analog converter. With the mobile device connected to the digital interface, the power from the battery is relayed to the mobile device via the digital interface, and concurrently, the digital signal being received on the digital interface from the mobile device is relayed to the input of the digital to analog converter.

Additionally disclosed is a method for forming a charging device, comprising, forming a housing having a distal side, proximal side, and a perimeter wall, and integrating a battery with the housing, the battery connected to a power supply. Then, forming a digital interface in the housing, connecting the digital interface to a digital to analog converter, the digital to analog converter being located in the housing, and connecting the digital to analog converter to an analog audio jack formed in the housing. The battery provides pass through power to the digital interface.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of a charging device, and is not intended to represent the only form in which it can be developed or utilized. The description sets forth the functions for developing and operating the adapter in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Figure 1A:
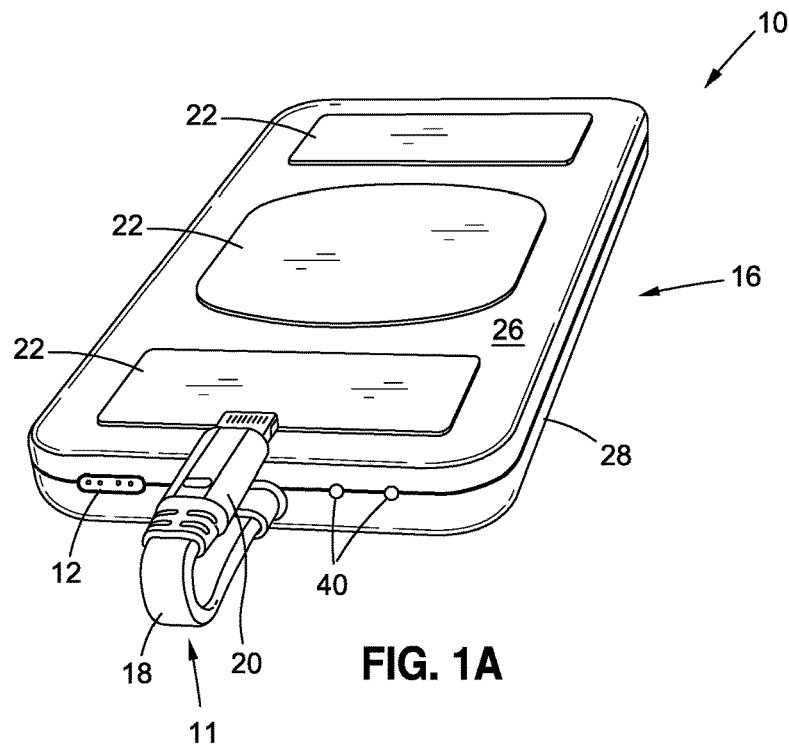
FIG. 1A shows a perspective view of an exemplary embodiment of the charging device.

FIGS. 1A, AB, and 1C depict embodiments of a charging device 10, which offers additional battery power, recharging of the battery, and pass through digital audio for a mobile device, as well as, in some embodiments, providing continuous power, or providing continuous power and pass through analog audio. A battery of the charging device 10 is coupled to the mobile device via a digital interface 11, comprising a cable 18, and a connector 20. A digital port 12 is mounted in a housing 16. The cable 18 includes a digital connector 20 on a first end 32, and is hard wired to the charging device 10 on a second, or opposite end 34. The housing 16 defines a distal side 24 and a proximal side 26 separated by a perimeter wall 28.

The housing may be made of any molded material which provides the structural strength to mount the digital interface 11 and the digital port 12. The digital interface 11 and the digital port 12 may be placed on a single side of the housing or may be placed on opposing sides, or adjacent sides. As will be discussed in further detail below, the interior of the adapter includes additional components to allow the proper passing of the audio from a digital audio connection to an analog audio connection, as well as to allow charging.

The digital port 12 may be used for connecting the charging device 10 to a power source, such as a transformer connected to an alternating current source, such as a wall plug, or connected to the transformer and wall plug through various other intermediate devices, such as a personal computer, or PC. The charging device 10 may also be connected to a direct current source, such as an automobile charging port, through the digital port 12. The connection of the digital port 12 to the power source recharges the battery of the charging device 10.

The digital port 12 may also be connected to a digital audio output device, such as a pair of headphones or speakers. In some embodiments the digital port 12 is configured to provide pass through power for powering active headphones or speakers. However, the digital port 12 cannot be connected to both a digital audio output device and a power source at the same time.

Figure 1B:
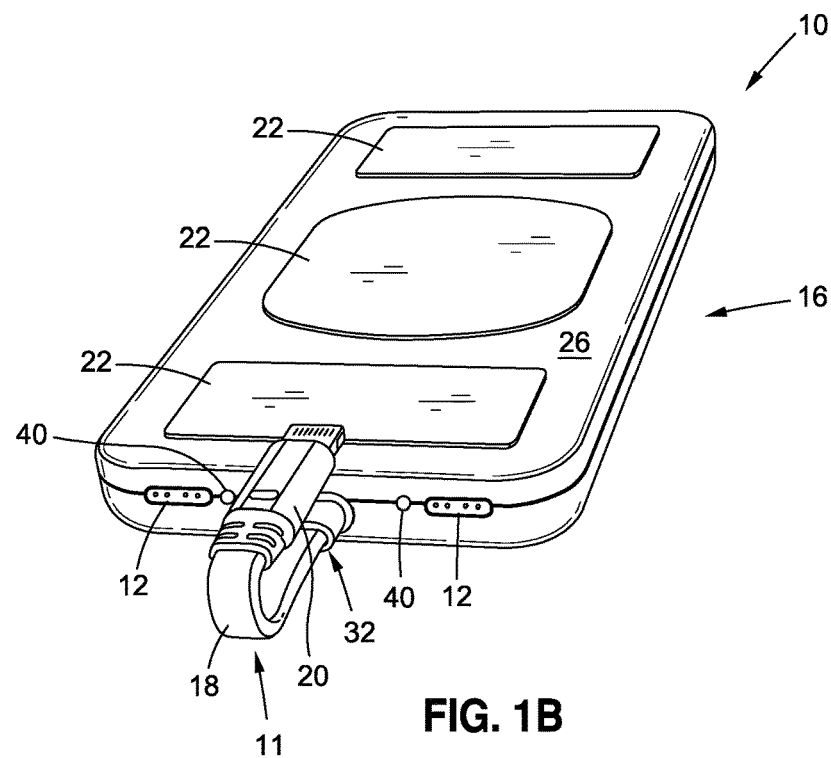
FIG. 1B shows a perspective view of a second embodiment of the charging device.

Another embodiment of the charging device is shown in FIG. 1B. This embodiment of the charging device is similar to that of the embodiment of FIG. 1A, except that this embodiment has a second digital port 12 mounted on the housing. The second digital port 12 would enable a user to simultaneously charge the battery of the charging device 10 with one digital port 12, and get throughput digital audio in the other. The functions of the two digital ports 12 may be interchangeable, that is, either digital port 12 may be used for charging the battery, or for digital audio output, or the function of the individual digital port 12 may be assigned, that is, the individual digital port 12 may only charge the batter or provide digital audio output.

Figure 1C:
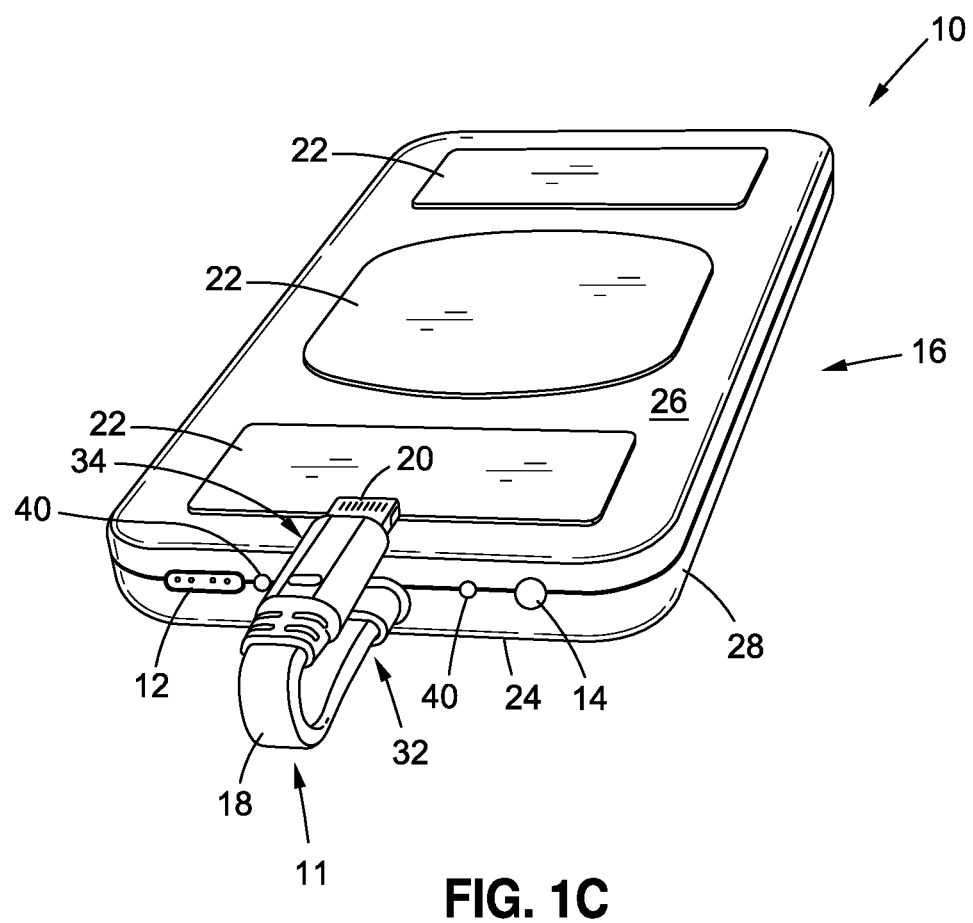
FIG. 1C shows a perspective view of a third embodiment of the charging device.

A third embodiment of the charging device 10 is shown in FIG. 1C. This embodiment is similar to that in FIG. 1A, but in addition to one digital port 12, the embodiment of FIG. 1C also has an analog audio port 14 formed on the housing. The analog audio port 14 may be a 3.5 mm jack. The digital port 12 in this embodiment may support charging the battery of the charging device 10, or may support both charging the battery of the charging device 10, and passing digital audio. The analog audio port 14 only passes an analog audio signal which has been converted from a digital audio signal output from the connected mobile device. The additional components which accomplish this conversion will be discussed in detail below.

Figure 2:
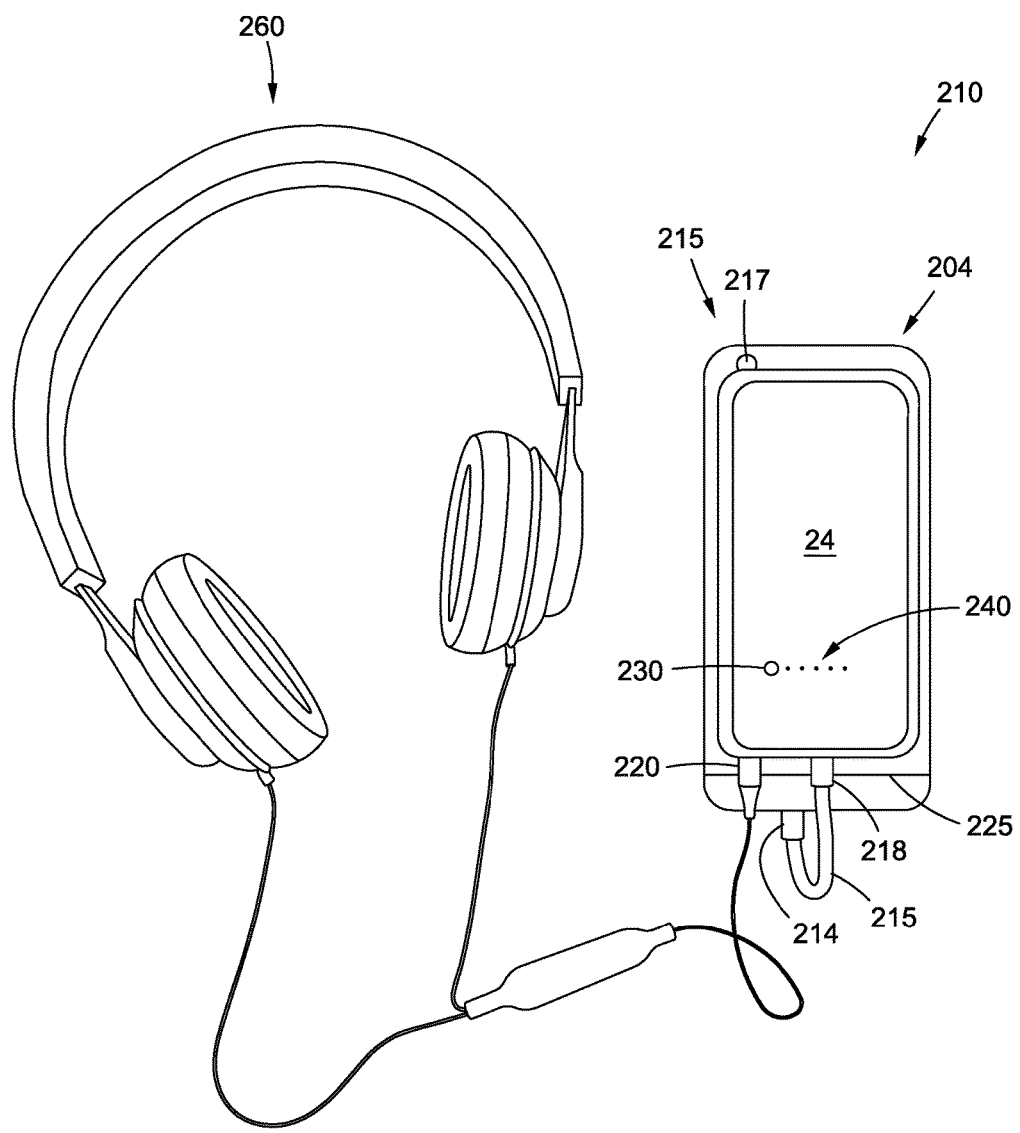
FIG. 2 shows a plan view of an exemplary embodiment of the charger device connected to a mobile device and a pair of headphones.

As shown in FIG. 2, the charging device 210 mounts to a distal side 225 of the mobile device 201. Many mobile devices have a camera system 213 included. The camera system includes a lens 217 mounted on the back of the device. Because the charging device attaches to the distal side of the mobile device, the positioning of the attachment of the charging device has the potential to obscure the lens. Thus, the housing on the charging device is sized such that the housing is narrower than the mobile device and shorter than the mobile device. When sized this way, as shown in FIG. 2, the charging device does not obscure the field of view of the lens on the mobile device.

In other embodiments, the charging device may have a housing with substantially the same length as the mobile device. In these embodiments, the charging device includes an aperture to accommodate the field of view of the camera on the phone.

With reference to FIGS. 1A-2, for each of the above embodiments, a power button or switch 230 may be located on a distal side 24 of the housing 16. Next to the power button may be plurality of light emitting diodes (LED) 240. In one embodiment there may be four LEDs. In other embodiments, there may 2, 3, 5, or more LEDs. The LEDs light when the power button is pressed in accordance with the charge level of the battery in the charging device 210. Thus, in the embodiment with four LEDs, when the battery of the charging device 210 is at half charge, two of the LEDs will light when the power button is pressed. The power button may recognize more than one length of press.

As shown in FIGS. 1A, 1B, 1C, and 2, in order to mount the charging device 210 to a distal side 225 of the mobile device 201, a proximal side 26 of the housing includes at least one magnet 22, though this is by way of example only and not of limitation. In one embodiment, the proximal side 26 includes three magnets 22. The magnets 22 may be made of neodymium. Alternatively, the magnets 22 may be any type of magnet which will not damage the mobile device to which the magnet attaches. In other embodiments, the proximal side 26 of the housing 16 may include another type of connector, such as a mechanical connector or clip. In these embodiments, the housing is made to a size that corresponds to the size of the mobile device so that the clips better correspond to the attachment points, such as corners, on the mobile device. Alternatively, the housing could use a persistent adhesive pad or a plurality of persistent adhesive pads in similar locations to that of the magnets.

In FIG. 2, a pair of headphones 260 are connected, via a 45 degree connector 215, to a jack. As disclosed above, depending on the embodiment, the jack may be a digital port 12 or an analog audio port 14. The connector 220 is connected to the mobile device 201, and the connector transfers a digital or signal from the mobile device via the cable 218 to the charging device. In the embodiments where an analog audio signal is passed out of the analog audio port 14, the signal is converted by a digital to analog converter, as will be described in greater detail below.

With reference to FIGS. 1A, 1B, and 1C, the housing may also include other features, such as light emitting diodes (LED) 40 on the perimeter wall 28. The LED 40 may be used to signal a user of various conditions or functions. For example, the LED 40 may be connected to a battery 330 (FIG. 3) internal to the housing. This LED 40 would light when the battery 330 (FIG. 3) is providing power through the digital interface 11, notifying the user of this condition. The LED 40 may also be programmed to flash to indicate that either or both of the digital interface or the analog audio jack are not connected to a corresponding connector. Alternatively, the LED 40 may change color to indicate different statuses. For example, when the charger is connected to the digital interface, but the analog audio jack is not connected to a corresponding connector, the LED 40 may be red. When both the digital interface and the analog audio jack are connected to a corresponding connector, the LED 40 may turn green. Any colors may be chosen and those given are by example only. In other embodiments, a plurality of LEDs 40 of the same or different colors may be used in the same manner. For example, there may be an individual LED 40 for each of indicated the connection to the digital interface, the cable and a connector in the analog audio jack, or just for indicating active connections in the digital interface and analog audio jack. Additionally, these two LEDs 40 could both be, for example, red when the battery in the housing is charged, but there is no connection in the digital interface or analog audio jack, and could change, for example, to green when the connectors corresponding to the digital interface or analog audio jack are connected.

Alternatively or additionally, in some embodiments the digital interface 11 is fitted with a light source. In these embodiments, the light may be used as a flashlight to find an opening of a corresponding digital port of the mobile device. The light in the digital interface makes the digital port of the mobile device easier to find in low light situations.

In one embodiment, the analog audio jack 14 is configured to accept a 3.5 mm stereo connector. In other embodiments the connectors may be of various sizes and configurations, for example, ¼ inch or 2.5 mm in addition to 3.5 mm or a ⅛ inch connector. In the 3.5 mm stereo connector, the signal is passed along a tip, a ring, and a sleeve of the connector. Thus, this type of connector is commonly called a tip-ring-sleeve or TRS connector. The analog audio jack 14 has contacts corresponding to the tip, ring, and sleeve of the connector. Each of the tip, ring, and sleeve is separated by a band of electrical insulating material.

In many new mobile devices, the mobile devices only have a digital port for output, rather than a digital port and an analog audio jack. As shown, the cable 18 extending from the housing is a digital cable. One end 32 of the cable is connected to the housing, and includes a strain relief element 62 where the cable is connected to the housing. A digital device connector 20 on the opposite end 34 of the cable 18 may be proprietary connector or may include a connector which conforms to an industry-recognized standard. As shown, the mobile device connector is the proprietary Lighting® connector from Apple®. In other embodiments, the mobile device connector could be a Type C USB connector, a mini USB connector, or a standard USB connector, or a 20 pin Samsung® phone connector, or an 18 pin Samsung® phone connector, or an 18 pin LG® connector, or a 12 pin SonyEricsson® connector, or any other connector used by a mobile device which may transfer a digital audio signal. The wire connecting the housing and the connector is insulated through the incorporation of a non-conducting shell 74, and the cable wire is of sufficient grade and type to pass a clean, or sufficiently high signal-to-noise ratio, signal from one connector to the other. The wire itself is referred to as a "flat" cable, in that it has a rectangular cross section that is greater in width than height. In other embodiments, the cable may be round in cross section, or have any other cross section to accommodate the desired type and grade of wire. In some embodiments, both ends of the cable may have connectors.

In some embodiments, both ends of the digital connector cable may include connectors, rather than the cable having one end integrated to the charging device. In these embodiments, the digital cable bridges between jacks on the mobile device and the charging device. The digital cable may include a strain relief element at the point of connection of the cable to the connectors. The cable may include any connector combination, with one on each end. In still other embodiments, the cable may further include a universal mount on either or both ends, where various adapter tips may be singularly mounted, in order to accommodate various proprietary and industry-standard connections.

Figure 3A:
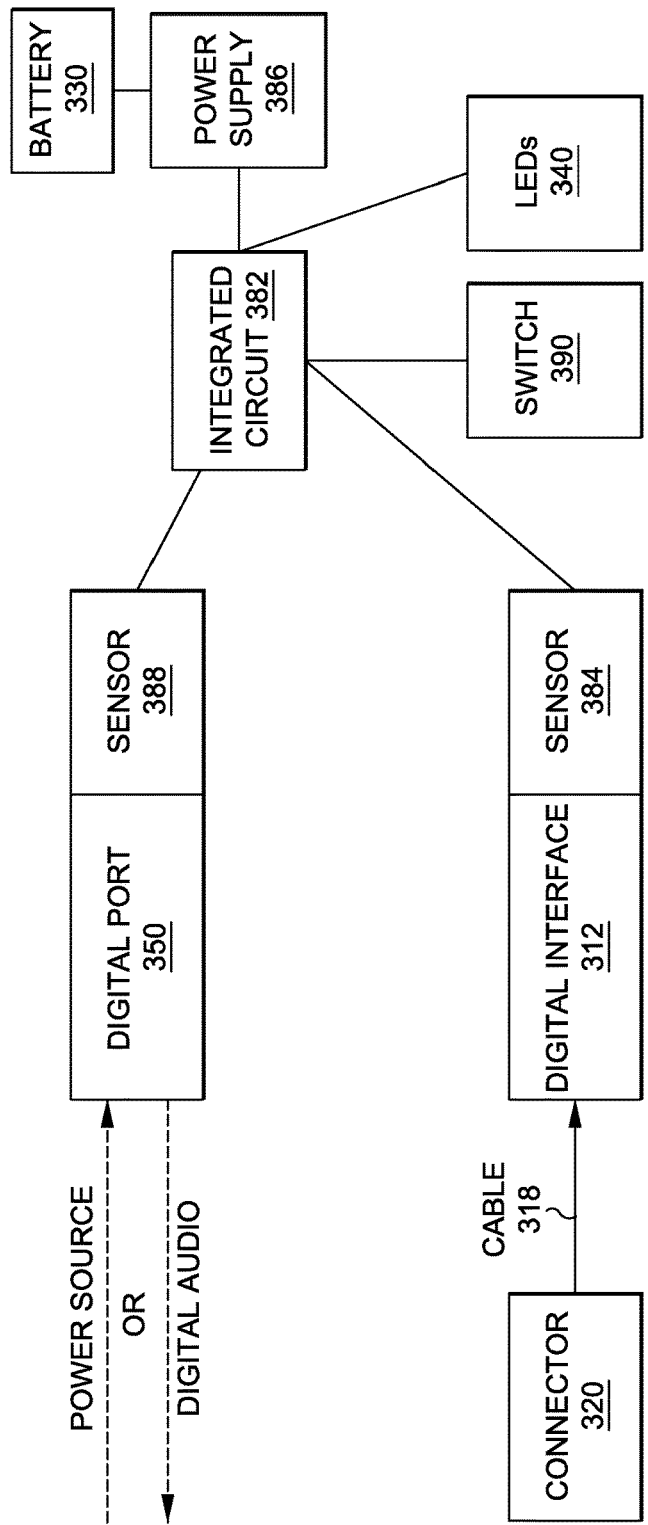
FIG. 3A shows a schematic block diagram corresponding to the embodiment of FIG. 1A.

Referring now to FIG. 3A, a block diagram of the adapter device corresponding to the embodiment described in reference to FIG. 1A is shown. A cable 318 as disclosed brings a digital signal in from a mobile device which is connected via the connector 320. The cable is connected to the charging device via a digital interface 312. The connection between the charging device and the mobile device via the digital interface includes attendant data, identifier, power (VCC) and ground lines which correspond to the pins on the connector 320 on the opposite end of the cable. Additionally, the digital interface is connected to a power supply 386 in the charging device to provide pass through power to the mobile device from the battery 330 of the charging device via the digital interface.

The digital port 350 may be connected to either a power source or a digital audio output connector. When connected to a power source, power flows through the digital port 350 to the integrated circuit 382, through the power supply 386 and finally to the battery 330 in order to charge the battery.

Alternatively, the digital port 350 may be connected to a digital audio output connector, the digital port 350 passes a digital audio signal to the connector and on to the digital audio device. If the digital audio device is a passive device, the digital audio signal may all that may be passed through the digital audio port 350. If the digital audio device is an active device, the digital port 350 may also pass power from the battery 330 through the digital port 350.

The digital port 350 may be configured to accept a proprietary connector or may include a connector which conforms to an industry-recognized standard. As shown, the digital port is configured to accept the proprietary Lighting® connector from Apple®. In other embodiments, the digital port could be configured to accept a Type C USB connector, a mini USB connector, or a standard USB connector, or a 20 pin Samsung® phone connector, or an 18 pin Samsung® phone connector, or an 18 pin LG® connector, or a 12 pin SonyEricsson® connector, or any other connector used by a mobile device which may transfer a digital audio signal or power.

The digital port 350 may have a sensor 388 connected to it. The sensor 388 may include a switch such that when no connector is inserted to the digital port 350, an internal switch is opened. The same switch closes when a connector is inserted in digital port 350. Thus, the sensor, including the switch, allows for connector insertion detection. The sensor may then be connected to LEDs 340 as discussed herein to provide a user indication that there is a connector present in the digital port.

Similarly, there may be a sensor 384 attached to the digital interface 312. The sensor 384 recognizes when the connector 320 is attached to a digital device. Similar to as described above, sensor 384 may also be connected to LEDs 340 as discussed herein to provide a user indication that the connector 320 is connected to a mobile device.

A switch 390 may also be connected to the integrated circuit 382. The switch 390 may be connected to some of the LEDs 340. As discussed above with reference to the embodiment of FIG. 1A, when the switch is pressed, a number of LEDs 340 light up corresponding to the charge remaining in the battery 330.

Figure 3B:
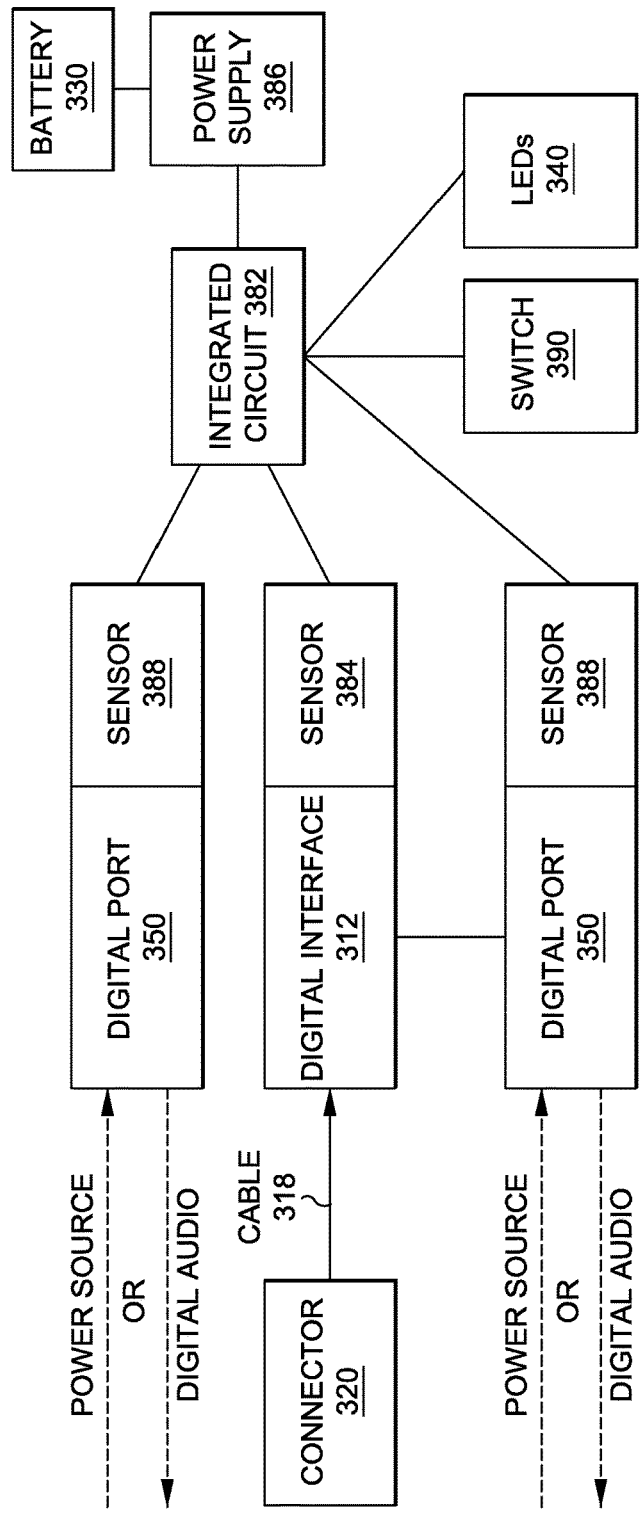
FIG. 3B shows a schematic block diagram corresponding to the embodiment of FIG. 1B.

Referring now to FIG. 3B, a block diagram of the adapter device corresponding to the embodiment described in reference to FIG. 1B is shown. As noted in the discussion of FIG. 1B, the embodiment of is similar to the previous embodiment, that of 3A, but has a second digital port 350.

A cable 318 as disclosed brings a digital signal in from a mobile device which is connected via the connector 320. The cable is connected to the charging device via a digital interface 312. The connection between the charging device and the mobile device via the digital interface includes attendant data, identifier, power (VCC) and ground lines which correspond to the pins on the connector 320 on the opposite end of the cable. Additionally, the digital interface is connected to a power supply 386 in the charging device to provide pass through power to the mobile device from the battery 330 of the charging device via the digital interface.

The digital port 350 may be connected to either a power source or a digital audio output connector. When connected to a power source, power flows through the digital port 350 to the integrated circuit 382, through the power supply 386 and finally to the battery 330 in order to charge the battery.

Alternatively, the digital port 350 may be connected to a digital audio output connector, the digital port 350 passes a digital audio signal to the connector and on to the digital audio device. If the digital audio device is a passive device, the digital audio signal may all that may be passed through the digital audio port 350. If the digital audio device is an active device, the digital port 350 may also pass power from the battery 330 through the digital port 350.

The digital port 350 may be configured to accept a proprietary connector or may include a connector which conforms to an industry-recognized standard. As shown, the digital port is configured to accept the proprietary Lighting® connector from Apple®. In other embodiments, the digital port could be configured to accept a Type C USB connector, a mini USB connector, or a standard USB connector, or a 20 pin Samsung® phone connector, or an 18 pin Samsung® phone connector, or an 18 pin LG® connector, or a 12 pin SonyEricsson® connector, or any other connector used by a mobile device which may transfer a digital audio signal or power.

Again alternatively, each digital port 350 may only be configured to accept power for charging the battery 330 or may only be configured to pass a digital audio signal to a digital audio device. In any of these configurations, because of the presence of two digital ports 350, a user is able to charge the battery and listen to a digital audio signal from the mobile device simultaneously.

Each digital port 350 may have a sensor 388 connected to it. The sensor 388 may include a switch such that when no connector is inserted to the digital port 350, an internal switch is opened. The same switch closes when a connector is inserted in digital port 350. Thus, the sensor, including the switch, allows for connector insertion detection. The sensor may then be connected to LEDs 340 as discussed herein to provide a user indication that there is a connector present in the digital port.

Similarly, there may be a sensor 384 attached to the digital interface 312. The sensor 384 recognizes when the connector 320 is attached to a digital device. Similar to as described above, sensor 384 may also be connected to LEDs 340 as discussed herein to provide a user indication that the connector 320 is connected to a mobile device.

A switch 390 may also be connected to the integrated circuit 382. The switch 390 may be connected to some of the LEDs 340. As discussed above with reference to the embodiment of FIG. 1A, when the switch is pressed, a number of LEDs 340 light up corresponding to the charge remaining in the battery 330.

Figure 3C:
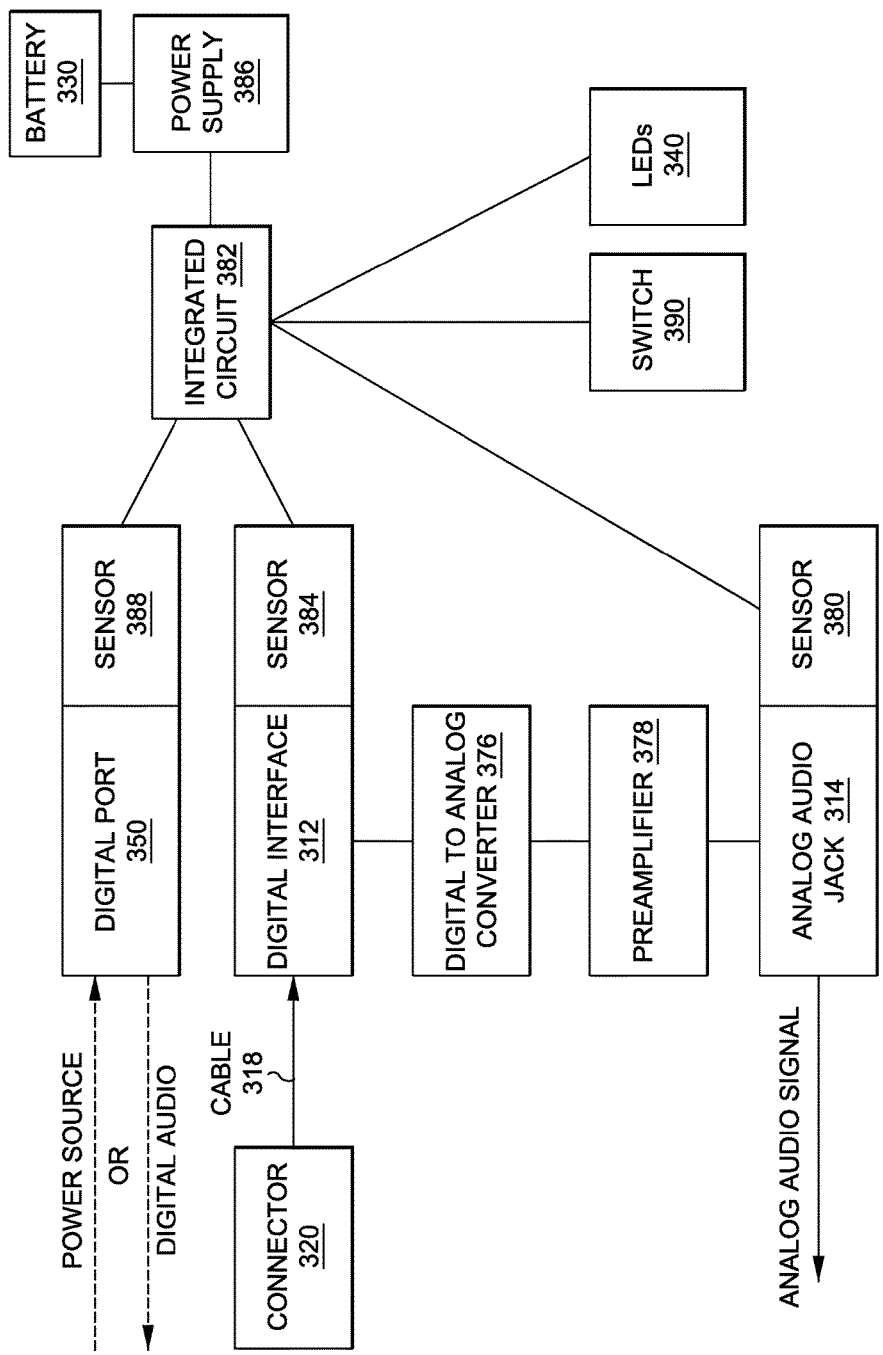
FIG. 3C shows a schematic block diagram corresponding to the embodiment of FIG. 1C.

Referring now to FIG. 3C, a block diagram of the adapter device corresponding to the embodiment described in reference to FIG. 1C is shown. A cable 318 as disclosed brings a digital signal in from a mobile device. The cable is connected to the charging device via a digital interface 312. The connection between the charging device and the mobile device via the digital interface includes attendant data, identifier, power (VCC) and ground lines which correspond to the pins on the connector 320 on the opposite end of the cable. Additionally, the digital interface is connected to a power supply 386 in the charging device to provide pass through power to the mobile device from the battery 330 of the charging device via the digital interface. The digital interface is further connected to a digital to analog converter 376.

The digital to analog converter (DAC) 376 is a circuit which receives a digital signal, which approximates, as closely as possible, binary data. As is well known in the art, given proper bit check and other integrity protocols, digital data can be transmitted, manipulated and stored without degradation. However, in order to drive an earphone or loudspeaker amplifier such as that found in a typical analog stereo system, the digital signal must be converted to an analog signal. The analog signal varies the frequency of a current, charge, or voltage to create the signal required for driving the headphones or for creating a signal which can be further amplified.

There are several DAC architectures known in the art. The suitability of any specific architecture for a specific use is determined by a plurality of parameters, with some of the main parameters including physical size, power consumption, resolution, speed, accuracy, and cost. Due to the complexity and need for precisely matched components, all but the most specialist DACs are implemented as integrated circuits. With an audio DAC, speed and resolution are primary factors, and typically a lower speed, high resolution DAC is used for audio applications. The DAC receives the digital signal provided and updates the voltage at uniform sampling intervals. These sampled voltages are then interpolated via a reconstruction filter to produce continuously varied voltage levels. For analog stereo applications, two channels of continuously varied voltage levels corresponding to a left channel signal and a right channel signal are output of the DAC.

In some embodiments, the output characteristics of the DAC require that the output analog signal receives some amount of amplification before being output to the analog audio jack, and therefore, the analog signal is output to a amplification circuit or pre-amplifier 378. Amplification of a signal close to the input, such as in this case, is typically referred to as pre-amplification. The pre-amplifier 378 is used to boost the signal strength in order for the signal to drive the cable to the main amplifier without significantly degrading the signal-to-noise ratio. The pre-amplification circuit can be an integrated circuit, such as an op-amp, or a transistor-based integrated circuit. In still other embodiments, a pre-amplification circuit may be integrated to the DAC.

The DAC or pre-amplification output is connected to an analog audio jack 314. The analog audio jack accepts an analog audio connector with a tip, ring, and sleeve configurations as described earlier. The analog audio jack has corresponding connectors for each of the tip, ring and sleeve of the analog audio connector. These tip ring, and sleeve analog audio connectors collectively carry an unbalanced stereo signal. A right channel signal and a left channel signal are carried essentially interchangeably, one channel signal on the tip, the other channel signal on the ring. Ground is typically carried on the sleeve. In some embodiments, the analog audio jack is a board mounted analog audio jack. Board-mounted versions of the analog audio jack a housing typically has five pin connectors. One pin connector is dedicated to the tip, one to the ring, and one to the sleeve, with two pin connectors left undedicated. When no connector is inserted to the jack, an internal switch connects the tip and ring pins to the adjacent undedicated pins, allowing connector insertion detection. Thus, there may be a sensor 380 integrated with the board mounted analog audio jack 314. The board-mounted analog audio jack may then be connected to LEDs 340 as discussed herein to provide a user indication that the analog audio jack is connected to an analog audio connector.

Alternatively, the sensor 380 may be a separate circuit. The sensor may be connected to an integrated circuit 382 which contains logic which operates the LEDs 340 in the manner disclosed for the LEDs 40 herein. The digital interface 312 may also be connected to a sensor 384 similar to the one connected to or integrated with, the analog audio jack. The sensor 384 also operates to send connection detection or non-detection signals to the integrated circuit 382. The integrated circuit may then control at least one LED in relation to the status of the connector 320 connected to the digital interface by the cable 318.

The analog audio jack connects to a corresponding connector from a pair of headphones or to a corresponding connector of a cable connecting an audio system. The audio system, may, for example, be part of a vehicle such as an automobile, boat, or airplane (not shown).

The digital port 350 may be connected to either a power source or a digital audio output connector. When connected to a power source, power flows through the digital port 350 to the integrated circuit 382, through the power supply 386 and finally to the battery 330 in order to charge the battery.

The digital port 350 may be configured to accept a proprietary connector or may include a connector which conforms to an industry-recognized standard. As shown, the digital port is configured to accept the proprietary Lighting® connector from Apple®. In other embodiments, the digital port could be configured to accept a Type C USB connector, a mini USB connector, or a standard USB connector, or a 20 pin Samsung® phone connector, or an 18 pin Samsung® phone connector, or an 18 pin LG® connector, or a 12 pin SonyEricsson® connector, or any other connector used by a mobile device which may transfer a digital audio signal or power.

A switch 390 may also be connected to the integrated circuit 382. The switch 390 may be connected to some of the LEDs 340. As discussed above with reference to the embodiment of FIG. 1A, when the switch is pressed, a number of LEDs 340 light up corresponding to the charge remaining in the battery 330.

Alternatively, the digital port 350 may be connected to a digital audio output connector, the digital port 350 passes a digital audio signal to the connector and on to the digital audio device. If the digital audio device is a passive device, the digital audio signal may all that may be passed through the digital audio port 350. If the digital audio device is an active device, the digital port 350 may also pass power from the battery 330 through the digital port 350. In some configurations the digital port 350 may be limited to connecting to a power source and may not pass digital audio signals.

The digital port 350 may have a sensor 388 connected to it. The sensor 388 may include a switch such that when no connector is inserted to the digital port 350, an internal switch is opened. The same switch closes when a connector is inserted in digital port 350. Thus, the sensor, including the switch, allows for connector insertion detection. The sensor may then be connected to LEDs 340 as discussed herein to provide a user indication that there is a connector present in the digital port.

Each of the respective components requiring power receives power from a power supply 386 which is in turn connected to a battery 330, the battery also charging the mobile device via to provision of pass through power via the digital interface 312, cable 318 and connector 320.

The above description is given by way of example, and not limitation. Given the above disclosure, one skilled in the art could devise variations that are within the scope and spirit of the invention disclosed herein, including various ways of notifying a user that the signal path has been completely connected. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A device for charging a mobile device, comprising:
   a housing defined by a distal side and a proximal side separated by a perimeter wall;
   a battery internal to the housing, the battery being receptive to power from an alternating current power source;
   a single digital interface integrated in to the housing and in electrical communication with the battery;
   a digital to analog converter with an input connected to the single digital interface and an output, the digital to analog converter being receptive to a digital signal from the single digital interface;
   an analog audio jack integrated in to the housing and connected to the output of the digital to analog converter, the analog audio jack being receptive to a two channel analog signal from the digital to analog converter to drive a load with an impedance of an audio transducer preamplifier; and
   a digital port which passes power from a power source to the battery;
   wherein with the mobile device connected to the single digital interface, the power from the battery is relayed to the mobile device via the single digital interface, and concurrently, the digital signal being received on the single digital interface from the mobile device is relayed to the input of the digital to analog converter, and connecting a first sensor to the digital port and a second sensor to the single digital interface which sense when there is a connector in the digital port or when the single digital interface is connected to a mobile device, or both.

2. The device of claim 1, wherein the analog audio jack is a 3.5 mm stereo adapter jack.

3. The device of claim 1, wherein the analog audio jack sends the two channel signal through connectors to the tip and sleeve of an analog audio connector.

4. The device of claim 1, further comprising a sensor integrated in to the housing and connected to the analog audio jack, the sensor being detecting the presence of a connector in the analog audio jack.

5. The device of claim 1, further comprising:
   an amplifier circuit, the analog signal output from the digital to analog converter being amplified thereby.

6. The device of claim 1, wherein the single digital interface is connected to a cable with a connector on the opposite end of the cable, the connector configured to connect to the mobile device.

7. The device of claim 6, wherein the single digital interface and the analog audio jack are disposed in the perimeter wall of the housing.

8. The device of claim 7, wherein the single digital interface and the analog audio jack are disposed on the same side of the perimeter wall.

9. The device of claim 7, wherein the single digital interface and the analog audio jack are disposed on opposite sides of the perimeter wall.

10. The device of claim 1, wherein the housing defines a proximal side and a distal side.

11. The device of claim 10, wherein the proximal side comprises at least one adhesive patch.

12. The device of claim 10, wherein the proximal side comprises three adhesive patches.

13. The device of claim 1, wherein the digital port passes power from a power source to the battery and passes a digital audio signal to an external device.

14. The device of claim 1, wherein the single digital interface is an Apple Lighting® plug.

15. The device of claim 1, wherein the single digital interface comprises 8 pins.

\* \* \* \* \*